United States Patent
Huber et al.

(10) Patent No.: US 6,747,856 B1
(45) Date of Patent: Jun. 8, 2004

(54) PROTECTIVE DEVICE AGAINST FAULT CURRENTS

(75) Inventors: Markus Huber, Obertraubling (DE); Gerald Lehner, Obertraubling (DE)

(73) Assignee: Siemens Aktiengesellschaft, Munich (DE)

(*) Notice: Subject to any disclaimer, the term of this patent is extended or adjusted under 35 U.S.C. 154(b) by 20 days.

(21) Appl. No.: 10/048,965

(22) PCT Filed: Jul. 17, 2000

(86) PCT No.: PCT/DE00/02305
§ 371 (c)(1),
(2), (4) Date: Feb. 5, 2002

(87) PCT Pub. No.: WO01/11745
PCT Pub. Date: Feb. 15, 2001

(30) Foreign Application Priority Data

Aug. 5, 1999 (DE) .......................... 199 37 061

(51) Int. Cl.⁷ .................................................. H02H 3/00
(52) U.S. Cl. ........................... 361/42; 361/45; 361/113
(58) Field of Search ............................. 361/42, 45, 113, 361/93.1, 91, 118

(56) References Cited

U.S. PATENT DOCUMENTS

| | | | | |
|---|---|---|---|---|
| 4,742,422 A | * | 5/1988 | Tigges | 361/45 |
| 5,969,930 A | * | 10/1999 | Bonniau et al. | 361/113 |
| 6,002,565 A | * | 12/1999 | Ronisch | 361/93.1 |

FOREIGN PATENT DOCUMENTS

| | | | | |
|---|---|---|---|---|
| DE | 35 43 985 A | 6/1987 | | H02H/3/16 |
| DE | 197 02 371 A1 | 7/1998 | | H02H/3/33 |
| EP | 0 855 779 A2 | 7/1998 | | H02H/3/33 |

* cited by examiner

*Primary Examiner*—Stephen W Jackson
(74) *Attorney, Agent, or Firm*—Harness, Dickey & Pierce, P.L.C.

(57) ABSTRACT

A device is for protecting against fault currents, even with frequencies of fault currents higher than 1 kHz. Additionally, it is for protecting against fires to dependably protect people. The converting core of a total current converter mounted upstream of a triggering arrangement, in a releasing circuit, is designed for detecting fault currents of different types. Further, an RC circuit is mounted parallel to the triggering arrangement, on the input side.

2 Claims, 2 Drawing Sheets

PROTECTIVE DEVICE AGAINST FAULT CURRENTS

The invention relates to a device for protecting against fault currents as claimed in the preamble of claim 1, having a total current converter and having a triggering arrangement and a triggering relay, in a triggering circuit, for the purpose of activating a switching mechanism switches is a conductor network. An electrical circuit along which an electrical monitored variable is generated and monitored and which generates an electrical triggering signal which activates a triggering relay, i.e. triggers, when a triggering condition is met, is referred to as a triggering circuit.

Such a device for protecting against fault currents, known for example from DE 3 543 985 A1, is used to ensure protection against a dangerous leakage current in an electrical system. Such a leakage current occurs, for example, if a person touches a voltage-conducting part of an electrical system. The fault current (or spill current) then flows to ground via the person's body as a leakage current. The protective device which is used to protect against dangerous leakage currents disconnects the respective circuit quickly and reliably from the mains when what is referred to as the triggering fault current is exceeded.

Figure 1:
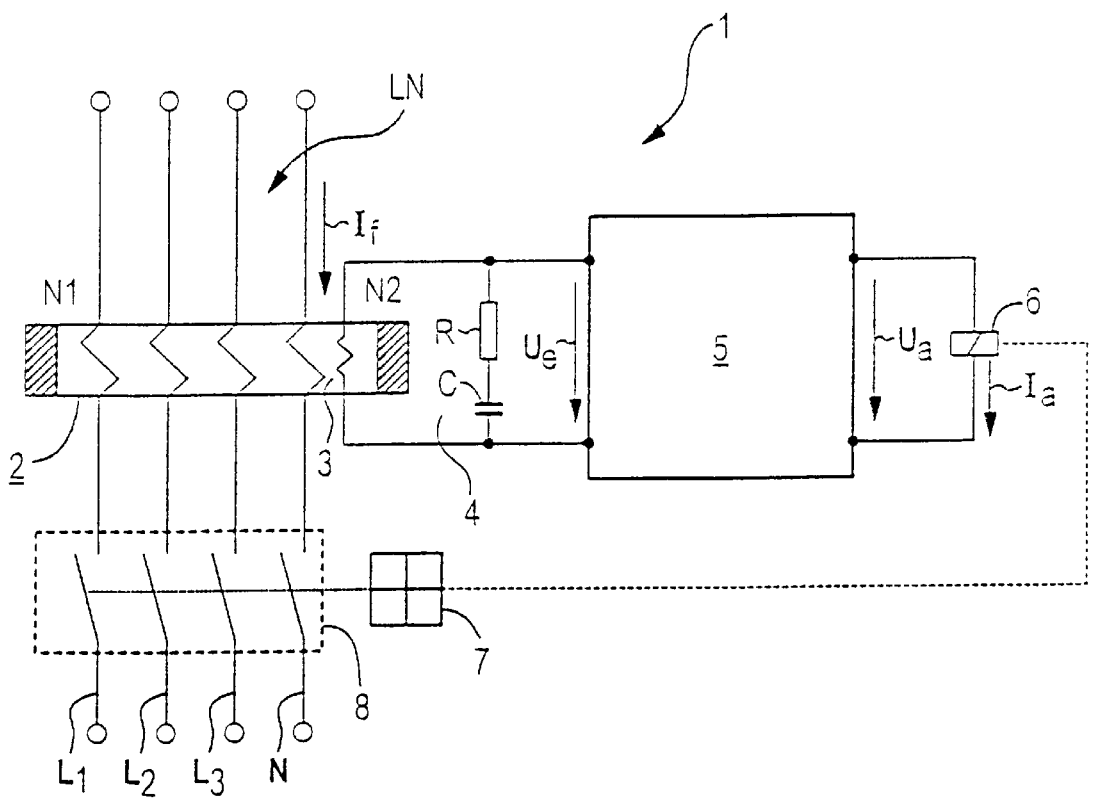
Figure 2:
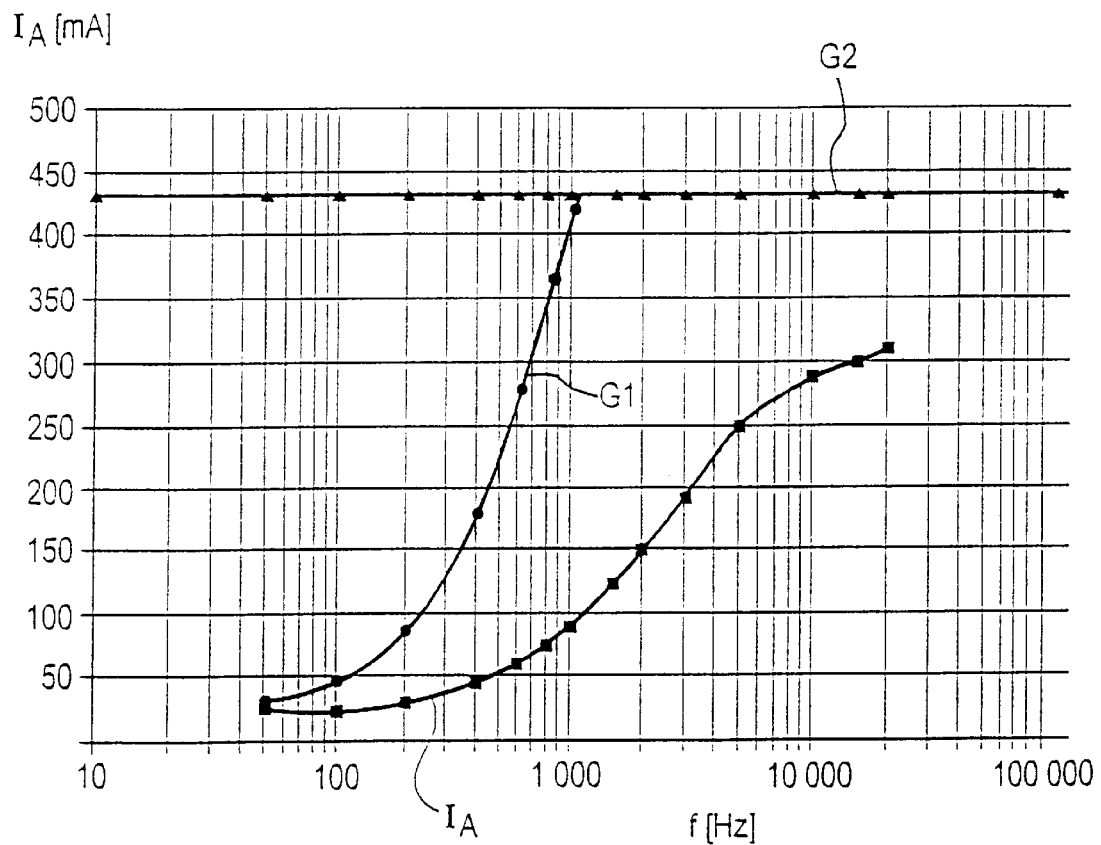

The design of known devices for protecting against fault currents is known, for example, from "etz" (1986), issue 20, pages 938 to 945. In said publication, basic circuit diagrams and functional principles of a fault current protective switch, which is independent of the mains voltage, and of a spill current protective switch, which is dependent on the voltage, are illustrated in FIGS. 1 to 3. The fault current protective switch and spill current protective switch are composed of three assemblies in a similar way. In the case of a fault circuit, a voltage signal is induced in the secondary winding of a total current converter through whose converter core all the current-conducting conductors of a conductor network are lead, said voltage signal actuating a triggering relay which is connected to the secondary winding via a triggering circuit electronic system or triggering arrangement. The triggering relay subsequently activates a switching mechanism by means of which the conductors of the conductor network are disconnected. Here, the triggering arrangement of the fault current protective switch is coupled via the total current converter to the conductor network in an exclusively conductive fashion. It thus obtains the energy necessary for triggering from the fault current itself, independently of the mains voltage. In contrast, in the case of the spill current protective switch, the triggering is dependent on the mains voltage and is done by means of an amplifier circuit which is electrically connected to the conductor network.

The triggering fault current is defined in the standard DIN VDE 0664 Part 10 (=German translation of the Rule EN 61008). It is the value of the fault current which triggers a fault current protective switch or spill current protective switch under defined conditions. The triggering fault current corresponds here to 0.5 to 1 times the dimensioning fault current which is a measure of the triggering sensitivity of the fault current protective switch or spill current protective switch. The dimensioning fault current can, for example, be defined as or set to 10 mA or 30 mA.

The triggering behavior of the protective switch is usually also adapted to a specific frequency, for example to 50 Hz, or to a specific frequency range, for example, to between 50 Hz and 400 Hz. Despite this adaptation, these protective devices can nevertheless provide personal protection even at relatively high frequencies provided that the triggering fault current lies below the predefined limiting curve for ventricular fibrillation according to the Rule IEC 479. According to this limiting curve, the triggering fault current can rise to approximately 420 mA at 1 Hz in order to continue to provide personal protection.

In order also to ensure protection against fires with such a protective device, in order to avoid fires an electrical power of a maximum of 100 W must not be exceeded, irrespective of the frequency. If a voltage between an external conductor and ground of 230 V is used as a basis, a fault current of at most 430 mA which must not be exceeded in order to avoid fires is obtained. With other mains voltages, other corresponding limiting values are obtained for the fault current.

The problem with previous detecting devices, in particular with devices for protecting against fault currents is, however, that their triggering fault current continuously rises as the frequency increases, and at high frequencies, in particular in the kilohertz range, exceeds the maximum acceptable value for protection against fires of, for example, 430 mA. In applications in electrical systems in which frequency converters and devices with clocked power supplies are used, fault currents with fault current frequencies of up to 20 kHz may additionally occur in the event of faults, with the consequence that the triggering fault current of the protective device or of the protective switch rises above the limiting value in the way described and a protection against fire is no longer ensured in all cases. As a result of the greatly increasing number of resources which can generate such fault currents with a relatively high frequency in the event of a fault, this problem is becoming increasingly important.

The invention is therefore based on the object of developing a device for protecting against fault currents or a fault current protective switch in such a way that fires can be reliably avoided and reliable personal protection is ensured.

This object is achieved according to the invention by means of the features of claim 1. For this purpose, on the one hand, the converter core, formed from nanocrystalline or amorphous material of the total current converter is configured to sense low-frequency and high-frequency fault currents. Furthermore, an RC element is connected in parallel on the input side. This RC element makes protection against fire possible here by being configured to limit the triggering fault current, in particular outside a relatively strict limiting curve for the protection of persons (G1), to a limiting current which is calculated as a quotient of the power limit required for protection against fire in W divided by the mains voltage provided in V.

The converter core can also be configured to sense alternating and/or pulse-shaped fault currents according to type A or type AC of the Rule EN 61008. In this connection, it can be configured to sense both low-frequency fault currents, in particular below 1 kHz, and high-frequency fault currents, in particular starting from 1 kHz to, for example, 20 kHz.

High frequency fault current forms of for example a plurality of kilohertz are sensed in particular by a total current converter whose converter core is formed from nanocrystalline or amorphous material. The use of nanocrystalline core material for this purpose is known per se, for example from DE 197 02 371 A1. Such a material is a quickly solidified, soft magnetic alloy with the advantage of an electrical resistance which is two to three times higher than that of crystalline soft magnetic materials. In conjunction with small band thicknesses of typically 20 μm for manufacturing reasons, eddy current losses are significantly reduced so that this amorphous or nanocrystalline material is advantageous in particular for the high-frequency range.

The invention is based here on the idea that in such a device for protecting against fault currents, even in a frequency range of between, for example, 50 Hz to 20 kHz both for protection against fire is ensured, if the triggering fault current lies below, for example, 430 mA at 100 W and 230 V, and at the same time personal protection is provided if the triggering fault current always lies below the limiting curve for ventricular fibrillation according to IEC 479. Given a frequency of 1 kHz, In addition, the value of the resistance of the RC element is dimensioned such that this resistance limits the triggering fault current to a specific value at high frequencies of up to approximately 20 kHz. This resistance then in fact constitutes a defined, frequency-independent burden for the total current converter while at the same time the capacitive resistance of the capacitor drops toward zero. The resistance is therefore preferably selected in such a way that even at relatively high frequencies the triggering fault current which is the maximum one for protection against fire, for example 430 mA at 100 W/230 V, is not exceeded.

The advantages which can be achieved with the invention are, in particular, the fact that by using amorphous or nanocrystalline material for the core of the total current converter while simultaneously switching an RC element parallel to the input of the triggering arrangement of the triggering circuit it is possible, with just a single fault current sensing system and with just a single secondary winding, to ensure personal protection and at the same time reliable protection against fire even with fault current frequencies above 1 kHz.

An exemplary embodiment of the invention is explained in more detail below with reference to a drawing, in which:

FIG. 1 is a schematic view of a device for protecting against fault currents with a triggering circuit which has an RC element between a total current converter and a triggering arrangement, and FIG. 2 is a logarithmically plotted frequency/triggering fault current diagram showing a limiting curve for ventricular fibrillation according to IEC 479, a limiting curve for avoiding fires and the triggering fault current curve of the protective device according to FIG. 1.

The device 1 for protecting against fault currents which is illustrated in FIG. 1 comprises a total current converter 2 with a converter core 3 which is composed of nanocrystalline or amorphous material and through which the three phases $L_i$, where i=1, 2, 3, and the neutral conductor N of a four conductor network LN are led. The fault current protective switch 1 is connected here upstream of an electrical load (not illustrated), which is supplied with current from the conductor network LN. The converter core 3 is furthermore provided with a primary winding N1 and with a secondary winding N2 which is connected to a triggering arrangement 5 in a triggering circuit 4. The device for protecting against fault currents is, for example, configured for a dimensioning fault current of 30 mA.

During fault-free operation of the conductor network LN and of the load, the vectorial sum of the currents flowing through the converter core 3 is always zero. A fault occurs if, for example owing to an insulation error, a portion of the supplied current is conducted away via ground at the load end as what is referred to as a fault or spill current $I_f$. In this case, the vectorial sum of the currents flowing through the converter core 3 yields a value which is different from zero. This spill current or fault current $I_f$ induces in the secondary winding N2 a voltage signal $U_e$ which serves as a measure of the fault current $I_f$ and which is fed to the triggering arrangement 5 at the input end. Said triggering arrangement 5 converts the input voltage $U_e$ into a triggering voltage $U_a$ and into a corresponding current $I_a$ which is conducted through a triggering relay 6.

If the fault current $I_f$ exceeds a setpoint value which is set in the triggering arrangement 5 and/or in the triggering relay 6, the triggering relay 6 which is connected to the triggering arrangement 5 at the output end and whose relay coil is embodied, for example, as a holding coil, is triggered. As a result, a switching mechanism 7 which is coupled to the triggering relay 6 opens the switch contacts of a switch 8 which acts on all the conductors $L_i$,N of the conductor network LN.

The triggering arrangement 5 is configured here either only for sensing sinusoidal alternating fault currents of the type AC according to EN 61008 or is dimensioned in such a way that the triggering conditions of the type A of the standard EN 61008 for pulse current-sensitive fault current protective switches are fulfilled. In order to achieve a high surge strength and a high degree of resistance to incorrect triggering, even for transient, i.e. non-periodic pulse-like fault currents in the relatively high frequency range, the triggering arrangement 5 preferably has a short-term delay, in a fashion which is not illustrated in more detail.

An RC element which is connected in parallel with the triggering arrangement 5 at the input end is preferably formed by a series arrangement of a resistor R and a capacitor C. The RC element is thus also connected in parallel with the secondary winding N2 of the total current converter 2. The RC element is tuned in such a way that as the frequency f of the sinusoidal fault current $I_f$ increases, the triggering fault current $I_A$ rises steeply only in such a way that the triggering fault current $I_A$ still lies with a sufficient safety margin below the limiting curve G1 (illustrated in FIG. 2) for ventricular fibrillation according to the standard IEC 479. The greater the capacitance of the capacitor C here, the steeper the rise in the triggering fault current $I_A$ with the fault current frequency f.

A triggering fault current profile which rises in this way as the fault current frequency f increases is particularly advantageous because the device 1 for protecting against fault currents is then particularly insensitive when fault currents $I_f$ occur in the relatively high frequency range, such as may occur in the conductor network LN for certain resources or pieces of equipment. So that the triggering fault current $I_A$ does not also exceed the maximum value which is acceptable for protection against fire, for example 430 mA at 100 W/230 V, according to the limiting curve G2 in FIG. 2 at relatively high fault current frequencies f, the resistor R is connected in series with the capacitor C. The resistor R limits the rise in the triggering fault current $I_A$ here to a specific value, namely to a value below the limiting curve G2 (below 430 mA here), because at high fault current frequencies f the resistor F constitutes a defined, frequency-independent burden for the total current converter 2, while the capacitive resistance of the capacitor C drops to zero.

In order to be able to set the frequency-dependent triggering fault current profile $I_A(f)$ with the RC element R, C in a defined fashion and thus avoid negatively influencing the frequency response, the triggering arrangement 5 should not have any parallel capacitors at the input end.

The protective device which is illustrated and described can also be used in a triggering arrangement 5 which operates with a center tap of the secondary winding N2. The objective of keeping the triggering fault current $I_A$ below the limiting curve G1 for ventricular fibrillation according to IEC 479 at least up to a fault current frequency f of 1 kHz, on the one hand, and at the same time keeping the triggering fault current $I_A$ below the limiting curve G2 starting from 1 kHz in order to avoid fires (430 mA at 230 V), on the other, is achieved by the series arrangement of the RC element parallel to the input of the triggering arrangement 5 in a way which is particularly simple in terms of fabrication and configuration, with just one fault current sensing system and with just one secondary winding N2.

What is claimed is:

1. A device for protecting against fault currents, comprising:
  - a total current converter;
  - a triggering arrangement;
  - a triggering relay of a triggering circuit, for activating a switching mechanism which switches a conductor network, wherein a converter core of the total current converter for sensing low-frequency and high-frequency fault currents, is formed from at least one of nanocrystalline and amorphous material; and
  - an RC element, formed by a series arrangement of a resistor and a capacitor and connected in parallel at an input end of the triggering arrangement, wherein the capacitance of the capacitor is dimensioned such that a triggering fault current lies at least up to a fault current frequency of 1 kHz below a predefined limiting curve for ventricular fibrillation in accordance with Rule IEC 479, and wherein a value of the resistor is dimensioned such that, even at fault current frequencies of up to approximately 20 kHz, the triggering fault current lies below a limiting curve which is acceptable for avoiding fires.

2. The device for protecting against fault currents as claimed in claim 1, wherein the converter core is configured for sensing at least one of alternating and pulse-shaped fault currents according to at least one of type A and type AC of the Rule EN 61008.

* * * * *